Dec. 11, 1934.  U. OSTWALD  1,983,870
LAMINATED MATERIAL AND METHOD OF PREPARING SAME
Original Filed Feb. 26, 1931
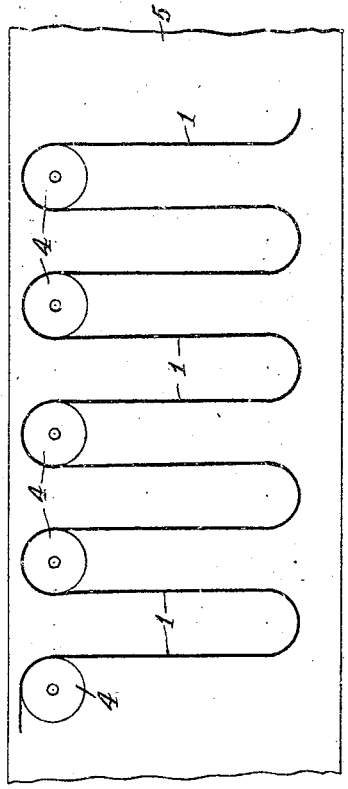
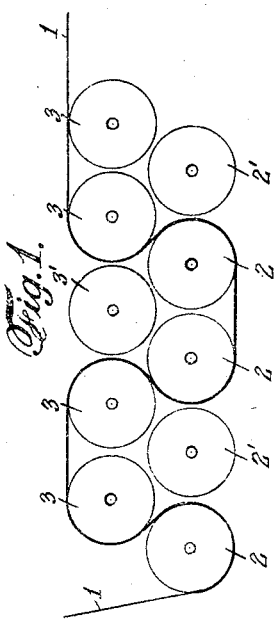
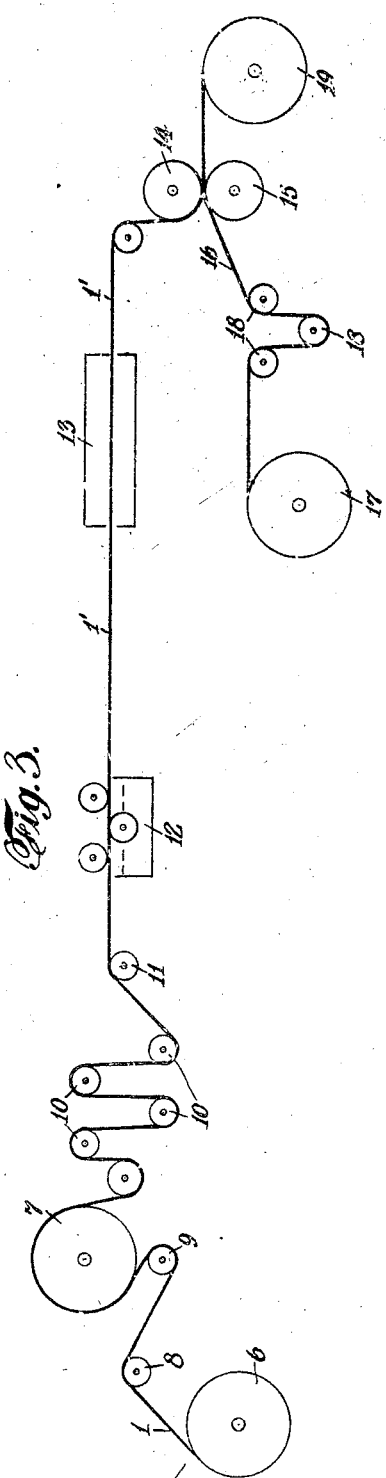
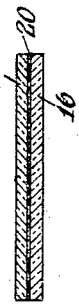
INVENTOR
BY
ATTORNEY Patented Dec. 11, 1934

1,983,870

UNITED STATES PATENT OFFICE 1,983,870

LAMINATED MATERIAL AND METHOD OF PREPARING SAME

Ulrich Ostwald, Wiesbaden-Biebrich, Germany, assignor to Du Pont Cellophane Company, Inc., New York, N. Y.

Application February 26, 1931, Serial No. 518,422.
Renewed June 12, 1934. In Germany March 4, 1930

15 Claims. (Cl. 154—40)

This invention relates to laminated materials. More particularly, it relates to a process of laminating sheets or films of regenerated cellulose to itself or other materials to produce a material which is not distorted, as by buckling, curling and/or wrinkling, and to the article resulting from said process.

Sheets or films of regenerated cellulose are produced by casting a viscose solution into a coagulating bath. The coagulated film is regenerated into cellulose, after which it is purified. Prior to drying, the film, while in the gel state, is preferably impregnated with glycerin. The drying is effected by passing the film between and over drying rolls arranged in such a manner that during its travel the film is constantly or almost constantly supported at every point throughout its entire width.

Ordinary sheets or films of regenerated cellulose, prepared as above described, are not moistureproof, that is, they do not resist to a substantial degree the penetration, passage or diffusion of moisture or water vapor therethrough for a substantial period of time. For many purposes a material which is moistureproof is desirable, and this is secured by combining the sheets or films of regenerated cellulose with a moistureproofing composition. In one of the modifications, the sheets or films of regenerated cellulose are coated with a moistureproofing composition comprising a cellulose derivative, a gum, a wax or waxy material with or without a plasticizer. In another modification the sheets or films of regenerated cellulose are coated with a moistureproofing composition comprising a synthetic resin and a wax. In still another modification the moistureproofing composition comprises a drying oil, a resin or gum and a wax.

Sheets or films of regenerated cellulose of both the ordinary (non-moistureproof) and moistureproof variety have been laminated to various materials such as paper, cardboard, fabric, metal foil and the like. These laminated materials, however, had a very serious defect in that the regenerated cellulose sheets or films shrank when exposed to the atmosphere. As a consequence, the base to which it was laminated buckled, curled and/or wrinkled. In some instances this phenomenon also occasioned the separation, at one or more places, of the sheet or film of regenerated cellulose from the other laminæ.

I have found that by shrinking the sheets or films of regenerated cellulose, either at some stage in the process of the production of the same, such as in the drying thereof and/or at some other stage prior to lamination, I can produce a laminated material in which the sheets or films of regenerated cellulose (moistureproof or otherwise) exhibit when exposed to the atmosphere a reduced tendency to curl, particularly in a transverse direction, as compared to similar materials made prior to this invention.

It is therefore an object of this invention to provide a laminated material having at least one of its plies comprising a sheet or film of regenerated cellulose, either of the moistureproof or non-moistureproof variety, which exhibits when exposed to the atmosphere a reduced tendency to curl, particularly in a transverse direction, as compared to similar materials made prior to this invention.

Another object of this invention is to provide a laminated material having at least one of its plies consisting of a previously shrunk sheet or film of regenerated cellulose, said sheet or film being of the ordinary or moistureproof type.

A further object of this invention is to provide a process for producing the above described laminated material.

An additional object is to provide a method of laminating ordinary or moistureproof sheets or films of regenerated cellulose to various bases such as paper, cardboard, fabrics, metal foil, etc. in which said sheets or films are shrunk prior to lamination.

Other objects will appear from the following description, appended claims and accompanying drawing forming a part of this specification and in which:

Figure 1 diagrammatically illustrates a drying apparatus wherein the sheets or films of regenerated cellulose are shrunk during the production thereof.

Figure 2 diagrammatically illustrates another form of apparatus and method of shrinking sheets or films of regenerated cellulose.

Figure 3 diagrammatically illustrates one form of an apparatus and method for producing laminated materials in accordance with this invention.

Figures 4, 5 and 6 are sectional views of several modifications of laminated materials which may be prepared in accordance with this invention.

The present invention, as is evident from the above mentioned objects, in one of its phases contemplates the production of a laminated material having at least one ply thereof comprising a sheet or film of regenerated cellulose which exhibits when exposed to the atmosphere a reduced tendency to curl, particularly in a transverse direction, as compared to similar materials made prior to this invention. This is obtained, in accordance with the principles of the present invention, by shrinking the sheet or film of regenerated cellulose prior to the laminating operation.

The shrinking of the sheet or film of regenerated cellulose may be effected during the process of producing said sheet or film. According to this procedure, a viscose solution is cast in a coagulating bath and the coagulated film re-generated into cellulose. The regenerated cellulose film is then purified (desulphured and bleached). Subsequently, it is impregnated with glycerin. The resultant film is finally dried as hereafter more particularly explained.

The film, after it comes from the glycerin bath and while in the gel state, is caused to pass over and/or through a drying mechanism in such a manner that the film shrinks during the drying thereof. It is apparent that this shrinkage during drying may be effected in various manners. However, in order to utilize the present apparatus, the film is caused to pass over the ordinary drying rolls as illustrated in Figure 1.

Referring to Figure 1 wherein drying rolls of the type usually employed in producing sheets or films of regenerated cellulose are diagrammatically illustrated, it will be observed that the film does not pass over all of the drying rolls. The film 1 coming, for instance, from the glycerinating bath (not shown) passes beneath the roll 2, over the upper rolls 3, 3, thence under the lower rolls 2, 2, and over the upper rolls 3, 3. It is to be noted that the film 1 in the course of its travel through this drying apparatus does not contact with the lower rolls 2' or the upper rolls 3'. In other words, the film, as it passes through this drying apparatus, always skips one of the rolls as illustrated. Because of the fact that a considerable portion of the film is out of contact with the drying rolls 2 and 3, it shrinks.

Another manner in which the sheet or film of regenerated cellulose may be shrunk consists in freely hanging the film in moist air and allowing it to dry freely. Referring to Figure 2 wherein such a procedure is diagrammatically illustrated, the sheet or film of regenerated cellulose 1 previously dried in usual manner is festooned over rollers 4 in a chamber 5 containing moist air, preferably circulated therethrough. The film is maintained in the chamber 5 until the desired results are secured.

In a continuous process, the chamber 5 is of such dimensions and/or the rate of travel of the film therethrough is such that upon exit therefrom the film will have shrunk as desired. The aforementioned procedure is specifically claimed in my divisional application Ser. No. 686,688, filed August 25, 1933.

When a shrunken sheet or film of regenerated cellulose is combined to any suitable support such as paper, cardboard, fabric, metal foils, etc., it will be found that when it is exposed to the atmosphere it exhibits a reduced tendency to curl, particularly in a transverse direction, as compared to similar materials made prior to this invention.

The laminating of the shrunken sheet or film of regenerated cellulose to any convenient base involves several important considerations. First of all, adhesives having aqueous vehicles should be avoided when shrunken sheets or films of regenerated cellulose are to form one or more of the plies of the laminated material. If an aqueous adhesive were employed, the water thereof would swell the regenerated cellulose, and the advantages of the prior shrinkage would be destroyed. Hence, it is desirable to employ as the adhesive a composition which will not deleteriously affect the shrunken sheet or film of regenerated cellulose. This is achieved by employing an adhesive having an organic solvent as the vehicle. Since, however, organic solvents evaporate with difficulty through the materials constituting the other laminae and only small quantities thereof are necessary to facilitate the application of the adhesive, the process contemplates eliminating the solvent prior to the laminating operation. Furthermore, the removal of the solvent is desirable in order to avoid the running of the colors or inks of indicia or decorative designs, such as posters, when such materials are laminated with the sheets or films of regenerated cellulose. Thus, the solid ingredients of the adhesive must be of such a nature that they will permit the securing of the materials. Inasmuch as the laminating operation is carried out under heat and pressure, the solid residue of the adhesive should be capable of softening or becoming tacky under the laminating conditions. Furthermore, the adhesive must possess such characteristics that the hygroscopicity of the sheets or films of regenerated cellulose has no deleterious effect thereon.

The following are examples of adhesives which have given satisfactory results:

Example I

| | |
|---|---|
| Polymerized vinyl acetate resin (Mowilith N) | 600 grams |
| Diethyl phthalate | 100 grams |
| Benzol | 4.5–5.0 liters |

This adhesive is particularly suitable for use with an uncoated surface of a sheet or film of regenerated cellulose or a surface which has been suitably coated in relation to the adhesive.

Example II

| | Per cent |
|---|---|
| Polyhydric alcohol-polybasic acid resin (Glyptal resin) | 75.00 |
| Polymerized terpene resin G (Flexoresin GG-1) | 21.20 |
| Polymerized terpene resin E (Flexoresin E-I) | 3.80 |

The above composition is dissolved in 3 times its weight of benzene.

The polyhydric alcohol-polybasic acid resin is the reaction product of the following ingredients in approximately the proportions given when heated in an open kettle for 4 to 5 hours at 200° C. to give a final resin having an acid number of approximately 50:

| | Parts |
|---|---|
| Glycerin | 18 |
| Phthalic anhydride | 44 |
| Castor oil | 38 |

Example III

| | Per cent |
|---|---|
| Polyhydric alcohol-polybasic acid resin (Glyptal resin) | 58.00 |
| Polymerized terpene resin G (Flexoresin GG-1) | 19.00 |
| Rosin oil | 23.00 |

The above composition is dissolved in 3 times its weight of benzene.

The polyhydric alcohol-polybasic acid resin is the reaction product of:

| | Parts |
|---|---|
| Glycerin | 28.5 |
| Phthalic anhydride | 47.0 |
| Dist. cottonseed fatty acids | 24.5 | heated in an open vessel at 180° C. for 1 hour followed by 4–5 hours at 225° C. to produce a final resin having an acid number of 25–30.

The adhesives set forth in Examples II and III are suitable for use with moistureproofed sheets or films of regenerated cellulose.

The adhesive for obvious reasons must be applied in a uniform thickness and in order to secure this the surface of the sheet or film of regenerated cellulose is smoothed as by ironing.

In order to more fully explain the process, the following description of one form thereof is hereafter set forth:

Referring now to Figure 3, the reference numeral 6 designates a roll of a, preferably loosely wound, film of regenerated cellulose shrunk as previously described and mounted on a horizontal adjustable support (not shown). Disposed in cooperative relation with the roll 6 is a suitable braking mechanism (not shown) which imparts to the roll the necessary tension in order to stretch the film sufficiently to revolve the rubber roller 7 which also serves for braking. Suitable guides 8 and 9 are also provided to direct the film 1 to the roller 7.

As mentioned above, it is desirable to iron the film 1 so that its surface is very smooth, whereby the adhesive may be applied in a uniform thickness. With this in view the film 1 is directed over a smoothing apparatus such as, for example, a plurality of driven ironing rolls 10 preferably heated to about 50° C. to 70° C. The film 1 is under the least possible tension necessary to produce the desired result. Preferably also, the diameters of the rolls 10 are such that only a slight tension of the film is necessary to impart the desired ironing effects.

After the film 1 has been smoothed, it is passed over a suitable guide 11 which also may serve as a brake and directed to the adhesive applying mechanism 12 which in the form illustrated applies the adhesives to the under surface of the film. The adhesive coated film 1 is then conducted through a heated zone such as a heated chamber 13 preferably also having heated air circulating therethrough. The temperature in the chamber is such that it is sufficient to substantially completely evaporate the solvent of the adhesives and to substantially dry the film of regenerated cellulose. During this drying operation the hygroscopically combined water in the film is eliminated and the film given a final shrinkage. For example, when the adhesive composition set forth in Example I is employed, satisfactory results are secured when the temperature within the chamber is approximately 80° C.–90° C.

From the heated chamber 13 the adhesive coated film 1 is directed to the calendering rolls 14 and 15 where it is laminated to the base 16. The pressure of the calender rolls 14 and 15 is capable of being regulated and adjusted in accordance with the requirements of the materials to be combined. Preferably, the roll 14 is heated in any suitable manner to such a temperature that it will soften the dry adhesive on the film. Also, the adhesive coated film is preferably caused to contact with the calender roll 14 through a relatively large arc of contact, in order to expedite the melting of the adhesive. Though two calender rolls are shown in the drawing, the invention is not restricted to that number since any desired number may be employed.

The base 16 to which the film 1 is to be secured is fed from a roll 17 mounted at any convenient place and having a suitable brake mechanism (not shown). Preferably, before the base 16 is introduced between the calender rolls 14 and 15, it is ironed by means of the rolls 18 to remove any creases, wrinkles, folds, etc. The laminated material is then wound on the roll 19.

Though the invention has been specifically described in connection with the lamination of roll stock, it is equally applicable to the lamination of sheets.

The laminated material resulting from the hereinbefore described process is illustrated in Figure 4. It comprises a shrunken film 1 of regenerated cellulose secured by means of the adhesive 20 to a base 16 which may be a preshrunk and/or moistureproof sheet or film of regenerated cellulose, cardboard, fabric, metal foil, etc.

It is obvious that either the film of regenerated cellulose or the base or both may be provided with indicia, decorative or otherwise.

If it is desired to moistureproof the film 1, it may be coated with a moistureproofing composition in the manner well known in the art. For instance, the film 1 of regenerated cellulose, after it has been combined with the base 16, may be provided with a moistureproof coating 21. As an alternative procedure, the surface of the film 1 which is to form one of the exterior surfaces of the final product may be provided with the moistureproof coating 21 prior to lamination. If desired, the film 1 may be provided with moistureproof coatings 21 on both sides thereof prior to laminating as shown in Figure 6.

Since it is obvious that various changes may be made in the specific details hereinbefore set forth, the invention is not restricted thereto except as defined in the appended claims.

I claim:

1. A method of laminating a sheet or film of regenerated cellulose to similar or other materials which comprises shrinking said sheet or film, applying a non-aqueous adhesive thereto, and laminating it to the desired material.

2. A method of laminating a sheet or film of regenerated cellulose to similar or other materials which comprises shrinking said sheet or film in an operation combined with the manufacture thereof, and thereafter laminating it to the desired material.

3. A method of laminating a sheet or film of regenerated cellulose to similar or other materials which comprises shrinking said sheet or film during the drying operation in the manufacture thereof, and thereafter laminating it to the desired material.

4. A method of laminating a sheet or film of regenerated cellulose to similar or other materials which comprises subjecting said sheet or film of regenerated cellulose dried in usual manner to a moist atmosphere and while hanging freely, and thereafter laminating it to the desired material.

5. A method of laminating a sheet or film of regenerated cellulose to similar or other materials which comprises applying an adhesive to a shrunken sheet or film of regenerated cellulose, substantially eliminating the hygroscopically combined water in said sheet or film, and laminating.

6. A method of laminating a sheet or film of regenerated cellulose to similar or other materials which comprises applying an adhesive to a shrunken sheet or film of regenerated cellulose, heating said sheet or film to substantially eliminate the hygroscopically combined water in said sheet or film, and laminating.

7. A method of laminating a sheet or film of regenerated cellulose to similar or other materials which comprises ironing a shrunken sheet or film of regenerated cellulose, applying an adhesive thereto, substantially eliminating the hygroscopically combined water in said sheet or film, and laminating.

8. A method of laminating a sheet or film of regenerated cellulose to similar or other materials which comprises ironing a shrunken sheet or film of regenerated cellulose, applying an adhesive thereto, heating said sheet or film to substantially eliminate the hygroscopically combined water in said sheet, and laminating.

9. A laminated material which exhibits a reduced tendency to curl when exposed to the atmosphere having at least one of its plies comprising a shrunken sheet or film of regenerated cellulose.

10. A laminated material which exhibits a reduced tendency to curl when exposed to the atmosphere having at least one of its plies comprising a moistureproof shrunken sheet or film of regenerated cellulose.

11. A laminated material which exhibits a reduced tendency to curl when exposed to the atmosphere having at least one of its plies comprising a shrunken sheet or film of regenerated cellulose coated with a moistureproofing composition.

12. A laminated material which exhibits a reduced tendency to curl when exposed to the atmosphere comprising a shrunken sheet or film of regenerated cellulose secured to the adjacent lamina by an adhesive which is not deleteriously affected by water.

13. A laminated material which exhibits a reduced tendency to curl when exposed to the atmosphere comprising a moistureproof shrunken sheet or film of regenerated cellulose secured to adjacent plies by an adhesive which is not deleteriously affected by water.

14. A laminated material which exhibits a reduced tendency to curl when exposed to the atmosphere comprising a shrunken sheet or film of regenerated cellulose secured to adjacent plies by a thermoplastic adhesive.

15. A laminated material which exhibits a reduced tendency to curl when exposed to the atmosphere comprising a moistureproof shrunken sheet or film of regenerated cellulose secured to adjacent plies by a thermoplastic adhesive.

ULRICH OSTWALD.